United States Patent [19]
Lang

[11] 4,093,353
[45] June 6, 1978

[54] OPTICAL RADIATION LIMITER

[75] Inventor: Kenneth T. Lang, Dover, Mass.

[73] Assignee: Honeywell Inc., Minneapolis, Minn.

[21] Appl. No.: 751,836

[22] Filed: Dec. 17, 1976

[51] Int. Cl.$^2$ .............................................. G02B 5/22
[52] U.S. Cl. ..................... 350/313; 250/352;
350/1.1; 350/318; 350/354
[58] Field of Search ............... 350/1, 160 R, 311–314, 350/316, 318; 250/352, 474

[56] References Cited
U.S. PATENT DOCUMENTS

| | | | |
|---|---|---|---|
| 2,964,619 | 12/1960 | Hahn et al. | 350/160 R X |
| 2,982,856 | 5/1961 | Camp | 350/1 X |
| 3,025,763 | 3/1962 | Schwartz et al. | 350/160 R |
| 3,152,215 | 10/1964 | Barstow et al. | 350/1 X |
| 3,506,333 | 4/1970 | Land | 350/160 R |
| 3,620,597 | 11/1971 | Schwartz et al. | 350/160 R |
| 3,714,430 | 1/1973 | Finvold et al. | 350/1 X |
| 3,981,561 | 9/1976 | Weiss et al. | 350/312 X |

FOREIGN PATENT DOCUMENTS 1,208,213  10/1970  United Kingdom ................ 350/311

OTHER PUBLICATIONS

Mark et al., "Temperature Control of Bandpass of Interference Filter", Applied Optics, vol. 9, No. 10, Oct. 1970, pp. 2305–2310.

*Primary Examiner*—John K. Corbin
*Assistant Examiner*—John D. Lee
*Attorney, Agent, or Firm*—Charles L. Rubow; Henry L. Hanson

[57] ABSTRACT

An optical limiter includes two bandpass filters whose narrow passbands are at least partially overlapping at low light levels. One of the two filters is well heat-sunk while the other is not. When the input light level exceeds a threshold level, heating causes the passband of the thermally isolated filter to shift relative to the passband of the heat-sunk filter. High level light self-limits or attenuates itself by virtue of the filter passband mismatch that occurs.

2 Claims, 3 Drawing Figures

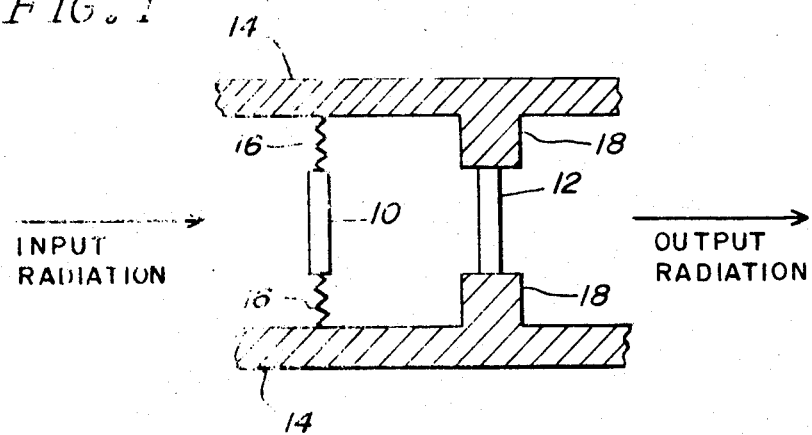
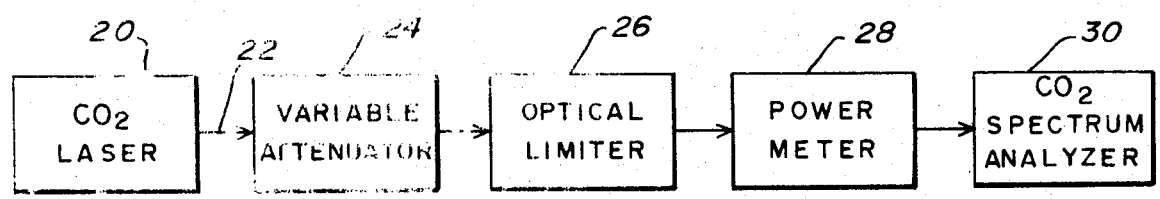

OPTICAL RADIATION LIMITER

BACKGROUND OF THE INVENTION

The present invention relates to an optical limiter for use in optical systems. In particular, the optical limiter limits radiation travelling along a path so as to protect an optical element such as a photodetector or the human eye from high intensity radiation which could damage that optical element.

Optical limiting or protective devices for optical systems have been of interest for a number of years. The major use of an optical limiter is to protect a photodetective device from high intensity radiation which could damage the device. For example, infrared detectors can be susceptible to damage from high intensity infrared radiation from a carbon dioxide laser. Similarly, both semiconductor photodetectors and the human eye are susceptible to damage caused by radiation from intense sources such as a nuclear explosion or the sun.

In many cases, it is not practical to totally filter out the particular wavelength or wavelengths of the high intensity source. Often these are the very wavelengths to which the photodetector is required to be responsive. For example, an infrared detector designed to operate in the 8 to 14 micron wavelength region cannot have these wavelengths completely filtered out.

The purpose of the optical limiter, therefore, is to limit the amount of radiation reaching the detector to a level which will not damage the detector. Many devices and systems have been suggested as optical limiters. U.S. Pat. Nos. 3,152,215 by Barstow et al and 3,714,430 by Finvold et al are examples of two types of optical limiters.

Many of these devices operate on the basis of an effect which shifts with temperature. The Finvold et al patent is an example of this type of device. Finvold et al describes the use of a variable density filter and a spectral bandpass filter or long wavelength rejection filter. The spectral filter is a thin slice of semiconductor direct bandgap material which has a very steep absorbing edge adjacent its inherent emitting line so that it passes the desired emission line at ordinary temperatures and attenuates the emission line at elevated temperatures.

A number of other devices, such as modulators, have been suggested which use temperature-dependent effects to provide modulation or variable attenuation of radiation. Examples of these types of devices are described in U.S. Pat. No. 2,964,619 by Hahn et al, 2,982,856 by Camp, and 3,025,763 by Schwartz et al.

Despite the interest and efforts in the field of optical limiters, further improvements are still desirable. For example, an optical limiter which uses a small number of relatively simple and inexpensive components is desirable.

SUMMARY OF THE INVENTION

The optical limiter of the present invention uses first and second bandpass filters. At radiation intensities less than a threshold level, the spectral passbands of the first and second bandpass filters partially overlap. The first bandpass filter is thermally isolated to a greater extent than the second bandpass filter so that radiation intensities greater than the threshold level cause a shift of the first spectral passband with respect to the second spectral passband. High intensity radiation, therefore, tends to limit or attenuate itself by virtue of the passband mismatch which occurs.

BRIEF DESCRIPTION OF THE DRAWINGS

FIG. 1 shows the optical limiter of the present invention.

FIG. 2 shows test apparatus used to test the optical limiter of the present invention.

DETAILED DESCRIPTION OF THE PREFERRED EMBODIMENTS

Figure 3:
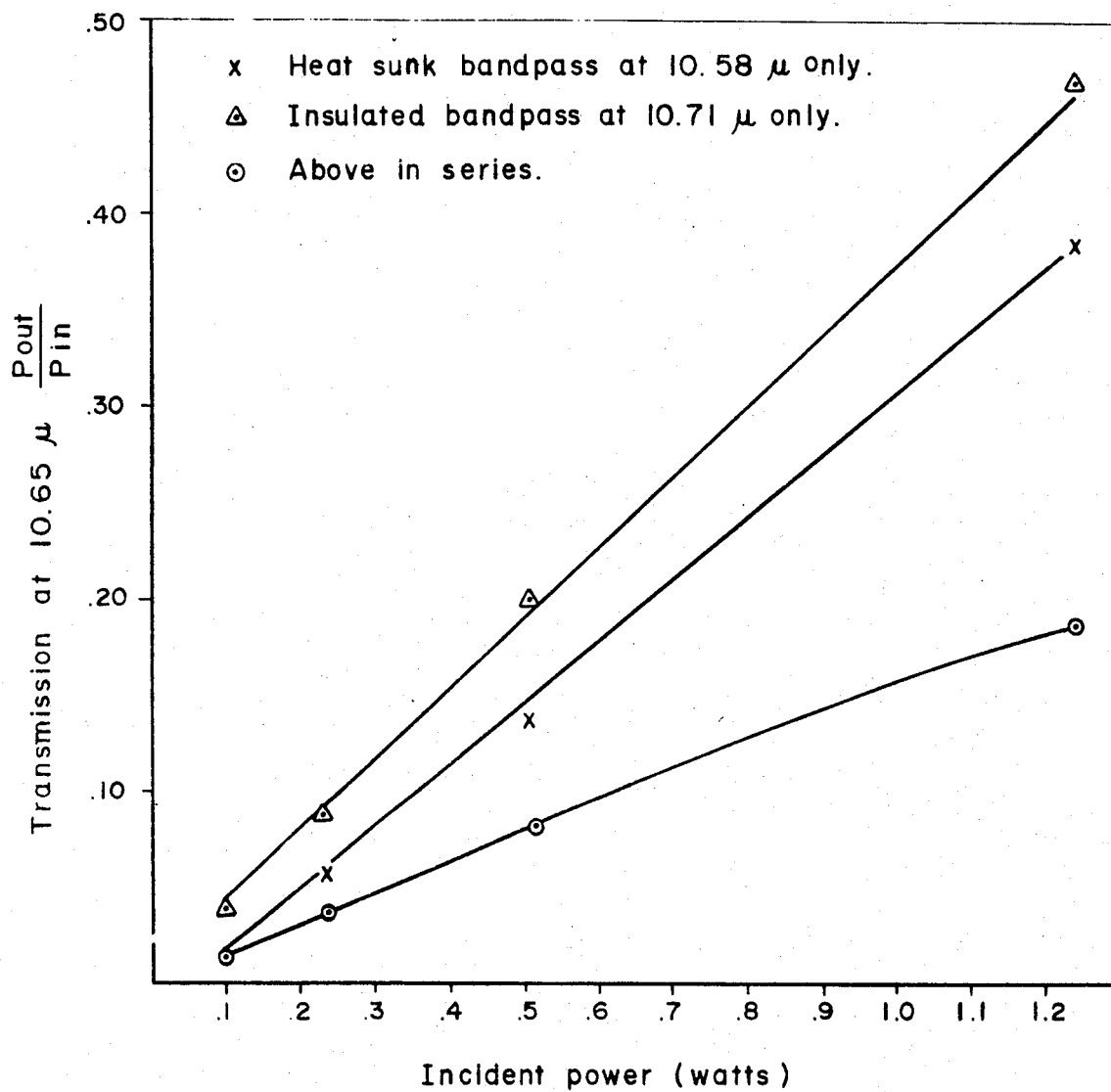
FIG. 3 shows transmission at 10.65 microns as a function of incident power as measured by the test apparatus shown in FIG. 2.

FIG. 1 shows the preferred embodiment of the optical limiter of the present invention. The optical limiter includes a first bandpass filter 10 and a second filter 12. Filters 10 and 12 are mounted in support struture 14 with first filter 10 thermally isolated from support structure 14 by thermal isolation 16, and second filter 12 thermally coupled to support structure 14 by thermal coupling 18.

Filters 10 and 12 have narrow passbands which are overlapping, at least to some extent, for radiation levels less than a predetermined threshold level. When the input radiation level exceeds the threshold level, heating causes the passband of filter 10 to shift relative to the passband of filter 12 because filter 12 is well heat-sunk and filter 10 is not. The result, therefore, is for high radiation intensities to selflimit or attenuate themselves by virtue of the filter passband mismatch that occurs due to differential heating of the two filters.

The optical limiter of the present invention has several advantages. First, it uses two commercially available bandpass filters rather than special optical elements. Second, the thermal isolation and thermal coupling to the support structure are relatively simple to provide.

FIG. 2 shows test apparatus which was used to test the optical limiter of FIG. 1. In these tests, carbon dioxide laser 20 produced a laser beam 22. Variable attenuator 24 was used to adjust the power level of laser beam 22. Optical limiter 26, which was of the type described in FIG. 1, then received the laser beam 22. The output beam from optical limiter 26 was received by power meter 28 and $CO_2$ spectrum analyzer 30.

In the test, the particular laser wavelength being considered was 10.65 microns. Bandpass filter 10 was a germanium bandpass filter commercially marketed by Optical Coating Laboratories, Inc. under stock number OCLI N 10712-9 having a center wavelength of 10.71 microns. Filter 12 was a germanium bandpass filter also commercially marketed by Optical Coating Laboratories, Inc. under stock number OCLI N 10585-9 having a center wavelength of 10.58 microns. The 10.58 micron bandpass filter was heat-sunk, while the 10.71 micron bandpass filter was not.

Measurements were made for the heat-sunk bandpass filter alone, the insulated bandpass filter alone, and the two filters in series. FIG. 3 shows transmission at 10.65 microns as a function of incident power. The transmission was defined as the ratio of the output power from optical limiter 26 divided by the input power of the beam entering optical limiter 26.

FIG. 3 shows that significant attentuation of the radiation is achieved when the two bandpass filters are placed in series. While the transmission of the heat-sunk bandpass filter only, the insulated bandpass filter only, and the series combination of the two bandpass filters are quite similar at low incident power, the difference becomes large at higher incident power. Significant optical limiting occurs at high incident power for the series combination of the heat-sunk bandpass filter and the insulated bandpass filter due to the relative shift of the passband of the insulated passband filter with respect to the passband of the heat-sunk bandpass filter.

In conclusion, the optical limiter of the present invention is a simple yet effective device for limiting the amount of radiation to a level which will not harm a photodetector. While the present invention has been described with reference to a preferred embodiment, workers skilled in the art will recognize that changes may be made in form and detail without departing from the spirit and scope of the invention. For example, the order of the two passband filters may be reversed from that shown in FIG. 1 with the results of the device remaining essentially the same.

The embodiments of the invention in which an exclusive property or right is claimed are defined as follows:

1. An optical limiter for limiting radiation travelling along a path, the optical limiter comprising:

first bandpass filter means positioned in the light path and having a first spectral passband which shifts with changes in temperature of the first bandpass filter means;

second bandpass filter means positioned in the light path and having a second spectral passband, the first and second spectral passbands at least partially overlapping when the radiation travelling along the path has an intensity less than a threshold level; and thermal isolation means for thermally isolating the first bandpass filter means to an extent greater than the second bandpass filter means, whereby radiation travelling along the path having intensity greater than the threshold level causes a shift of the first spectral passband with respect to the second spectral passband.

2. An optical limiter for limiting radiation travelling along a path, the optical limiter comprising:

first bandpass filter means positioned in the path and having a temperature sensitive first spectral passband;

second bandpass filter means positioned in the path and having a temperature sensitive second spectral passband which at least partially overlaps the first spectral passband;

heat sink means for heat sinking the second bandpass filter means; and thermal isolation means for thermally isolating the first bandpass filter means, whereby radiation intensity greater than a threshold level causes a shift of the first spectral passband with respect to the second spectral passband.

* * * * *